(12) United States Patent
Aoyagi et al.

(10) Patent No.: US 11,703,110 B2
(45) Date of Patent: Jul. 18, 2023

(54) DRIVE MECHANISM AND PUNCHING DEVICE

(71) Applicants: THE SCHOOL CORPORATION KANSAI UNIVERSITY, Osaka (JP); AIKI RIOTECH CORPORATION, Aichi (JP)

(72) Inventors: Seiji Aoyagi, Osaka (JP); Hajime Matsumoto, Aichi (JP)

(73) Assignees: THE SCHOOL CORPORATION KANSAI UNIVERSITY, Osaka (JP); AIKI RIOTECH CORPORATION, Aichi (JP)

( * ) Notice: Subject to any disclaimer, the term of this patent is extended or adjusted under 35 U.S.C. 154(b) by 92 days.

(21) Appl. No.: 17/283,890

(22) PCT Filed: Oct. 9, 2019

(86) PCT No.: PCT/JP2019/039742
§ 371 (c)(1),
(2) Date: Apr. 8, 2021

(87) PCT Pub. No.: WO2020/075736
PCT Pub. Date: Apr. 16, 2020

(65) Prior Publication Data
US 2021/0317900 A1     Oct. 14, 2021

(30) Foreign Application Priority Data
Oct. 12, 2018    (JP) ................. 2018-193783

(51) Int. Cl.
*F16H 25/12*    (2006.01)
(52) U.S. Cl.
CPC ................. *F16H 25/125* (2013.01)
(58) Field of Classification Search
CPC ............... F16H 25/125; A61M 5/32
See application file for complete search history.

(56) References Cited

U.S. PATENT DOCUMENTS 3,058,369 A * 10/1962 Vogel ............... F16H 25/125
74/567
5,266,359 A * 11/1993 Spielvogel ........... A61L 29/085
428/35.8

(Continued)

FOREIGN PATENT DOCUMENTS

DE    2012227 A1    9/1971
DE    19548593 A1   7/1997

(Continued)

OTHER PUBLICATIONS

Extended European Search Report for 19870502.2-1122 / 3865064 PCT/JP2019039741 dated Jun. 28, 2022, 7 pgs.

(Continued)

*Primary Examiner* — Terence Boes
(74) *Attorney, Agent, or Firm* — Preti Flaherty Beliveau & Pachios LLP

(57) ABSTRACT

Provided is a mechanism that causes a rod-shaped member to rotate while causing rod parts, which are part of the rod-shaped member, to carry out out-of-phase reciprocating motions. A drive mechanism (100) in accordance with an aspect of the present invention includes: a rotatable rod (10) that includes rod parts (11) which are separated by a boundary along a central axis 1, the rod parts (11) each being independently movable along the central axis (1); support members (A and B) having a slide groove (31) that is in the form of a ring and that surrounds the rotatable rod (10); and an outer cylinder (50) that is disposed between the rotatable rod (10) and the support members (A and B) and that has longitudinal grooves (51) each extending along the central axis (1).

3 Claims, 11 Drawing Sheets

(56) References Cited

U.S. PATENT DOCUMENTS

| | | | | |
|---|---|---|---|---|
| 6,139,562 | A | * | 10/2000 | Mauze ............... A61B 5/14514 606/171 |
| 7,901,363 | B2 | * | 3/2011 | Duchon ............. A61B 5/15117 600/583 |
| 2015/0190587 | A1 | * | 7/2015 | Peh ..................... A61M 5/3286 604/164.08 |
| 2016/0067739 | A1 | * | 3/2016 | Jones ........................ B41J 2/22 118/712 |

FOREIGN PATENT DOCUMENTS

| | | | |
|---|---|---|---|
| FR | 2269001 | A1 | 11/1975 |
| JP | 64002877 | A | 1/1989 |
| JP | 05-317324 | A | 12/1993 |
| JP | 2005-317324 | A | 12/1993 |
| JP | 09229157 | A | 9/1997 |
| JP | 1999-309134 | B2 | 9/1999 |
| JP | 2001-082568 | A | 3/2001 |
| JP | 2004-057516 | A | 2/2004 |
| JP | 2004-073298 | A | 3/2004 |
| JP | 2006-521886 | A | 9/2006 |
| JP | 2015-100889 | A | 6/2015 |
| JP | 2017-000620 | A | 1/2017 |
| WO | 2020/075735 | A1 | 4/2020 |

OTHER PUBLICATIONS

International Preliminary Report on Patentability, PCT/US2019/039741 dated Apr. 22, 2021, 6 pgs.

International Search Report, PCT/US2019/039741 dated Jan. 7, 2020, 2 pgs.

International Preliminary Report on Patentability, PCT/US2019/039742 dated Apr. 22, 2021, 8 pgs.

International Search Report, PCT/US2019/039742 dated Dec. 24, 2019, 2 pgs.

Yamada et al. "Proposal of New Blood Sampling Method Using Microneedle—Use of Reciprocating Rotation, Visualization of Blood Vessels," Copyright 2018 JSPE, 2 pgs.

Article Title: rack and pinion, Website Name: Encyclopaedia Britannica, Publisher: Encyclopaedia Britannica, Inc., Date Published: Apr. 4, 2007, URL: https://www.britannica.com/technology/rack-and-pinion Access Date: Feb. 24, 2023.

Title: Heason Technical Blog Ball Screw Applications, https://www.heason.com/news-media/technical-blog-archive/ball-screw-applications#:~:text=What%20is%20a%20Ball%20Screw,screw%20shaft%20and%20the%20nut; Access Date: Feb. 24, 2023, Copyright Heason 2019.

* cited by examiner (a)

(b)

DRIVE MECHANISM AND PUNCHING DEVICE

TECHNICAL FIELD

The present invention relate to a drive mechanism and a perforating apparatus including the drive mechanism.

BACKGROUND ART

Rotational motion and reciprocating motion are each a kind of basic mechanical action. However, the following mechanism has not been developed so far: a mechanism for causing a rod-shaped member to rotate while causing rod parts (which are part of the rod-shaped member) to carry out out-of-phase reciprocating motions.

SUMMARY OF INVENTION

Technical Problem

As described above, the following mechanism has not been developed: a mechanism for causing a rod-shaped member to rotate while causing rod parts (which are part of the rod-shaped member) to carry out out-of-phase reciprocating motions. An object of an aspect of the present invention is to provide such a mechanism.

Solution to Problem

A drive mechanism in accordance with an aspect of the present invention includes: (i) a rotatable rod that includes rod parts which are separated by a boundary along a central axis, the rod parts each being independently movable along the central axis; (ii) a support member having a slide groove that is in the form of a ring and that surrounds the rotatable rod; and (iii) an outer cylinder that is disposed between the rotatable rod and the support member and that has longitudinal grooves each extending along the central axis, in which: the rod parts have respective protrusions that stick out from side surfaces of the respective rod parts; the protrusions are capable of sliding in the slide groove and the longitudinal grooves; the rod parts having the respective protrusions are configured such that sliding of each of the protrusions in the slide groove causes a corresponding one of the rod parts to move along the central axis, and; the protrusions are configured such that rotation of the outer cylinder about the central axis causes each of the protrusions to slide in the slide groove.

A drive mechanism in accordance with another aspect of the present invention includes: (i) a rotatable rod that includes rod parts which are separated by a boundary along a central axis, the rod parts each being independently movable along the central axis; (ii) cam followers connected to the respective rod parts; (iii) rotating cams in each of which a distance from a center of rotation to an outer circumferential surface is not constant; and (iv) a cam rotating mechanism configured to cause the rotating cams to rotate out of phase with each other, in which: the cam followers abut the outer circumferential surfaces of the respective rotating cams and are configured to move along the central axis as the rotating cams rotate; and the rotatable rod, the cam followers, the rotating cams, and the cam rotating mechanism are configured to be rotatable about the central axis.

Advantageous Effects of Invention

An aspect of the present invention provides a mechanism for causing a rod-shaped member to rotate while causing rod parts (which are part of the rod-shaped member) to carry out out-of-phase reciprocating motions.

BRIEF DESCRIPTION OF DRAWINGS (a) of FIG. 1 is an exploded view illustrating an example of a rotatable rod and rod parts in accordance with Embodiment 1 of the present invention. (b) of FIG. 1 is a perspective view illustrating an example of a support member and a slide groove in accordance with Embodiment 1 of the present invention. (c) of FIG. 1 is a perspective view illustrating another example of the support member and the slide groove in accordance with Embodiment 1 of the present invention. (d) of FIG. 1 is a perspective view illustrating an example of an outer cylinder in accordance with Embodiment 1 of the present invention.

Figure 4:
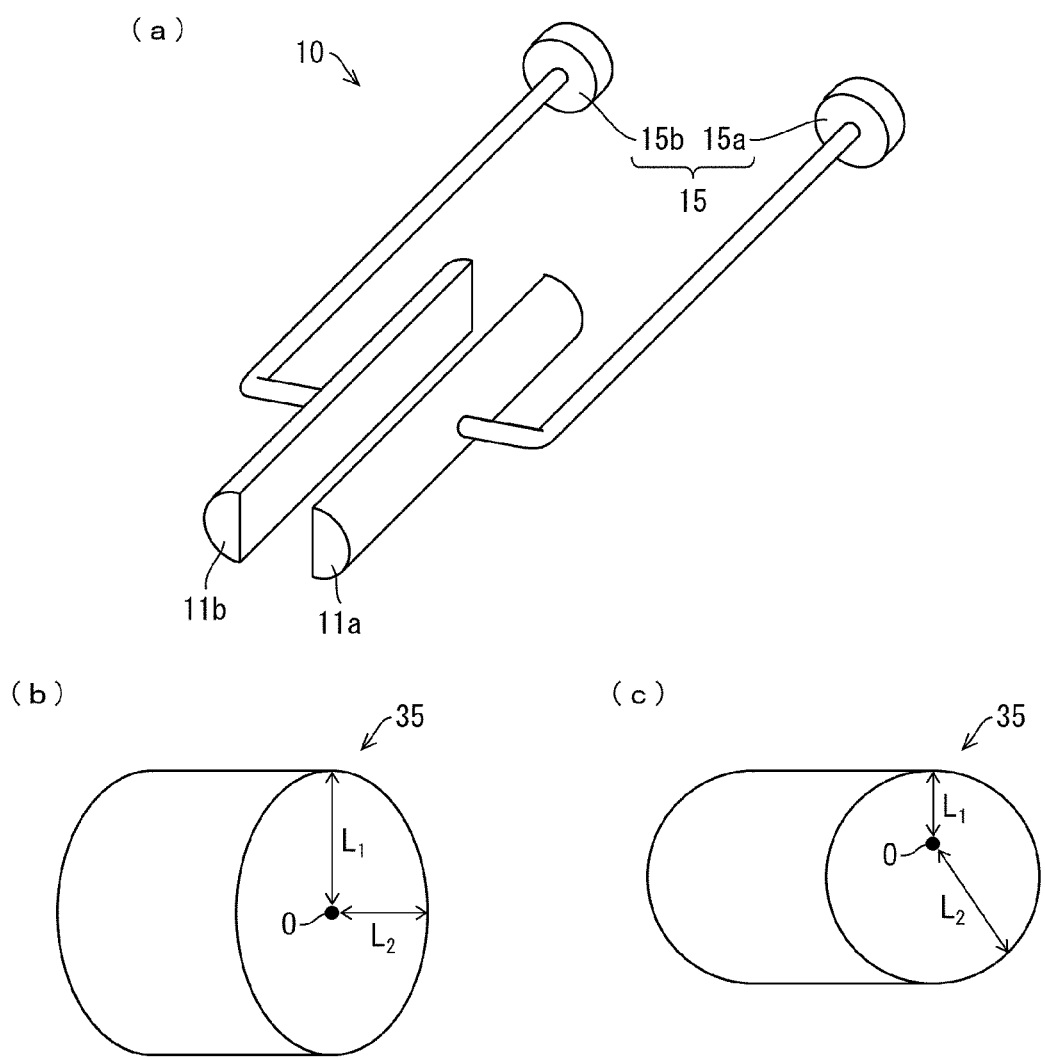

(a) of FIG. 4 is an exploded view illustrating an example of a rotatable rod and an example of rod parts and cam followers in accordance with Embodiment 2 of the present invention. (b) of FIG. 4 is a perspective view illustrating an example of a rotating cam in accordance with Embodiment 2 of the present invention. (c) of FIG. 4 is a perspective view illustrating another example of the rotating cam in accordance with Embodiment 2 of the present invention.

Figure 5:
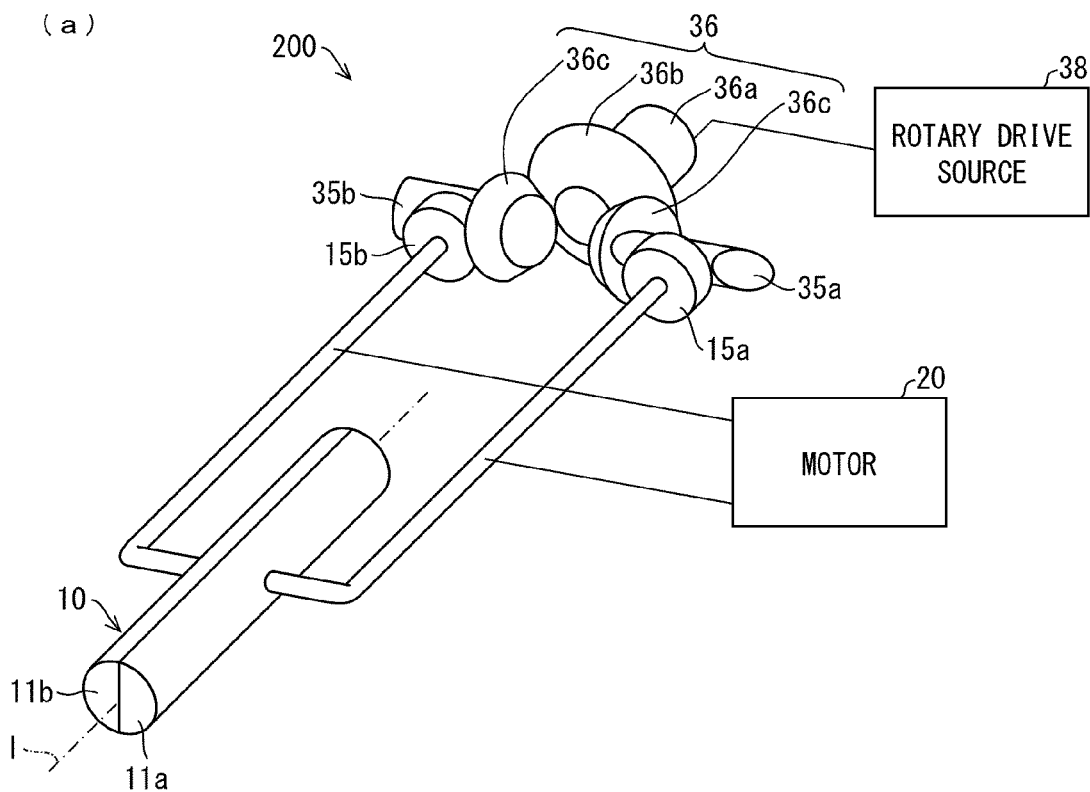
Figure 5:
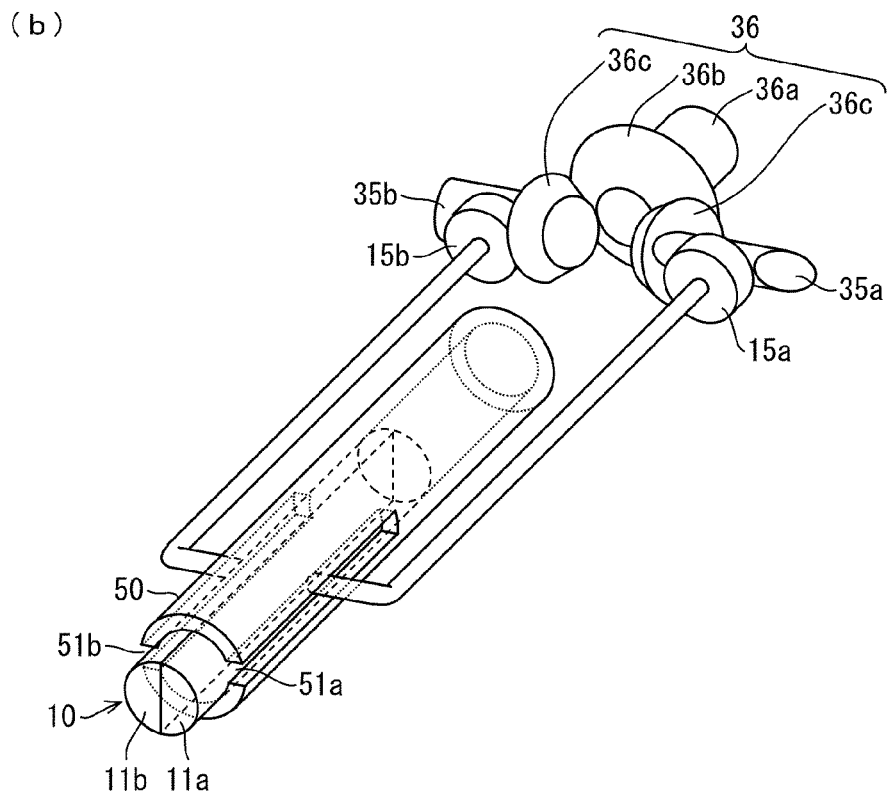

FIG. 5 illustrates a drive mechanism in accordance with Embodiment 2 of the present invention in an assembled state. (a) of FIG. 5 illustrates the drive mechanism including no outer cylinder. (b) of FIG. 5 illustrates the drive mechanism including an outer cylinder.

Figure 6:
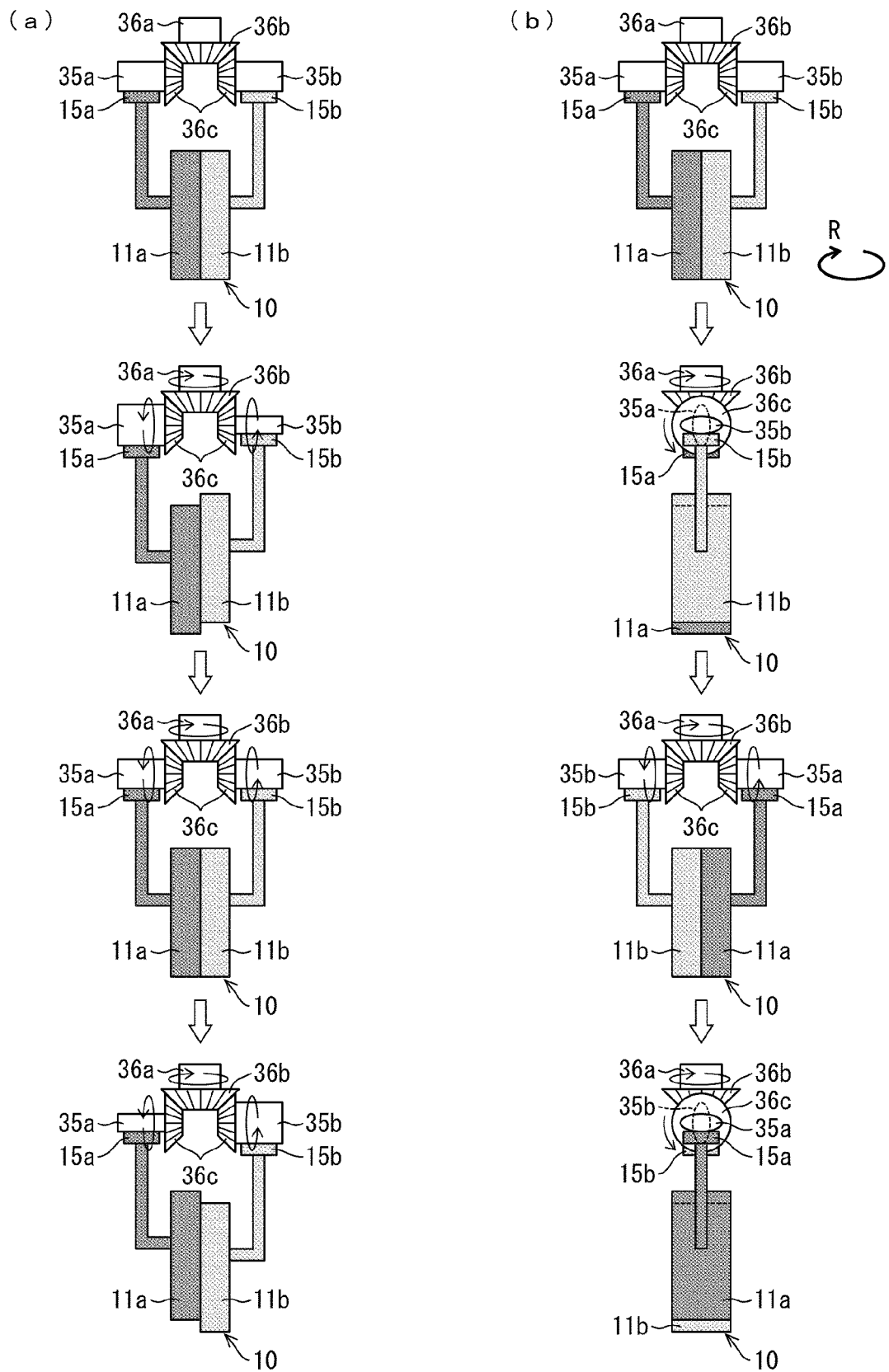

FIG. 6 shows transition diagrams illustrating the manner in which the drive mechanism in accordance with Embodiment 2 of the present invention carries out driving.

Figure 7:
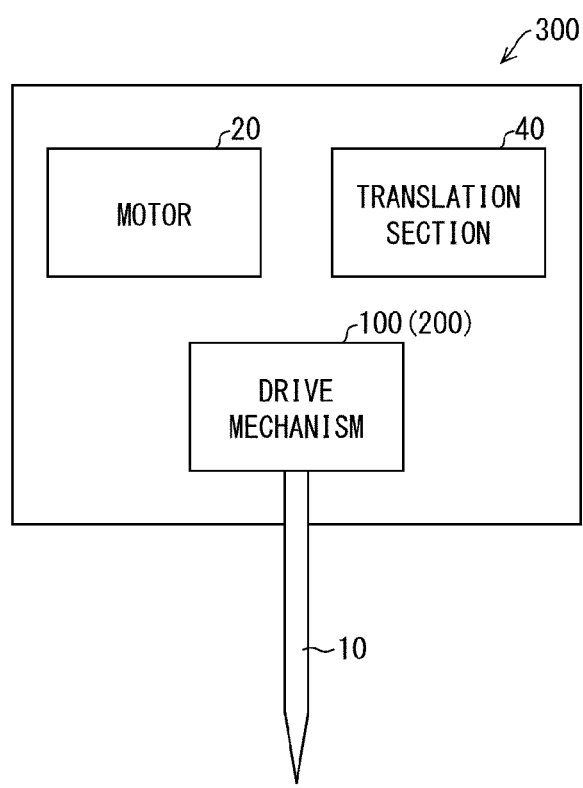

FIG. 7 is a block diagram illustrating a main part of a perforating apparatus in accordance with Embodiment 3 of the present invention.

Figure 8:
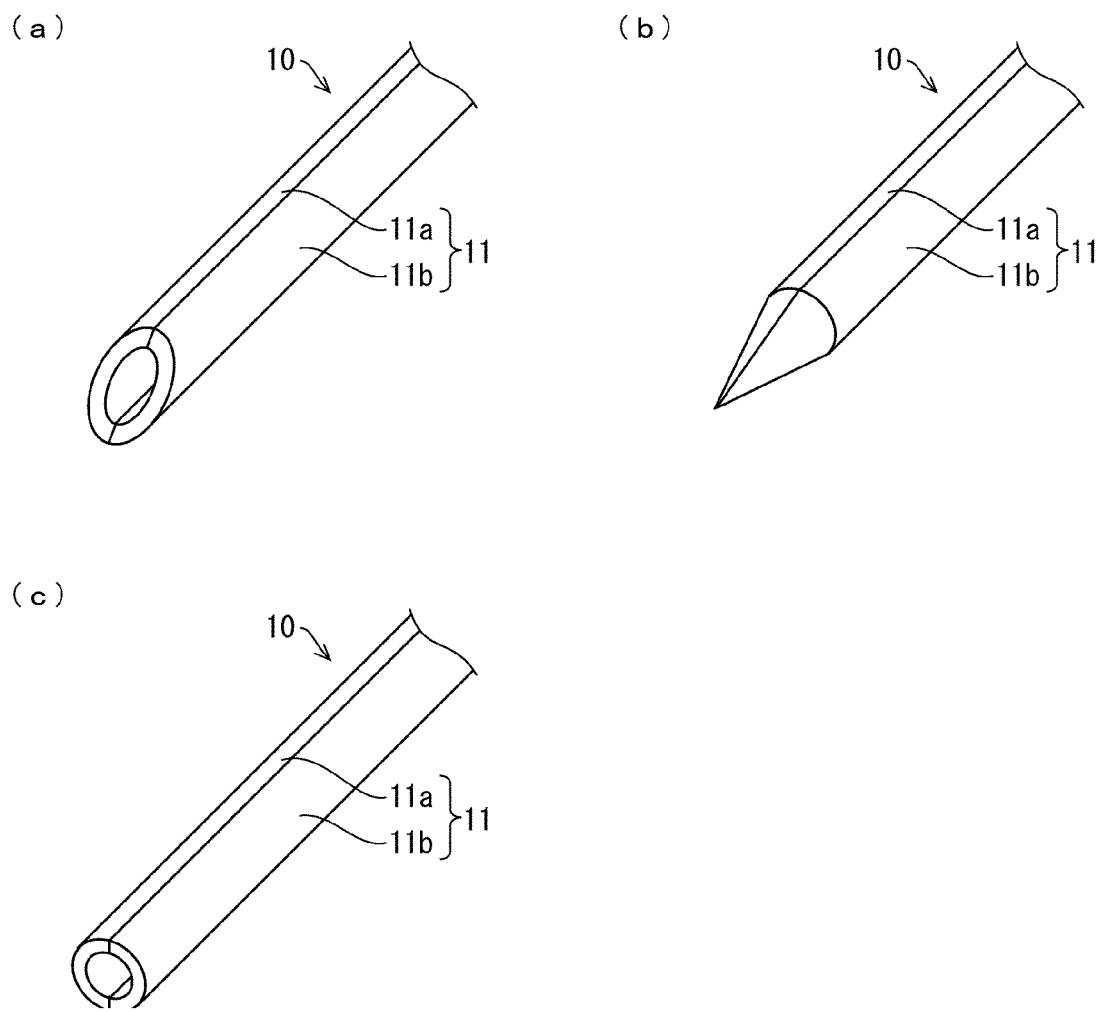

(a) to (c) of FIG. 8 are perspective views each illustrating an example of the tip of a rotatable rod of the perforating apparatus in accordance with Embodiment 3 of the present invention.

Figure 9:
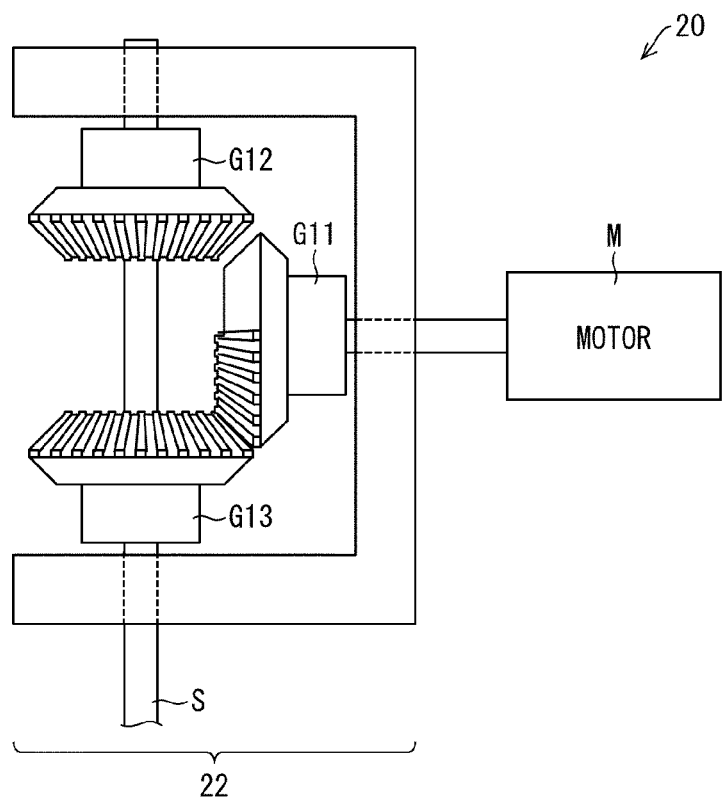

FIG. 9 schematically illustrates an example of a configuration of a mechanical conversion mechanism.

Figure 10:
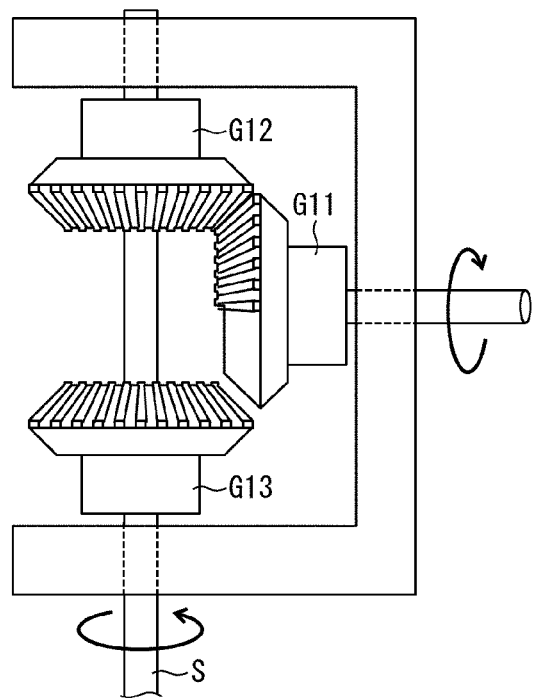
Figure 10:
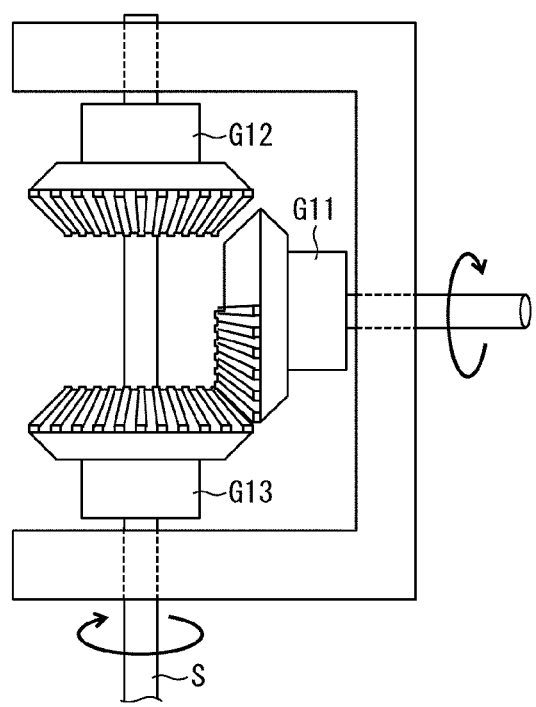

(a) and (b) of FIG. 10 schematically illustrate the manner in which the direction of rotation is reversed by the mechanical conversion mechanism.

Figure 11:
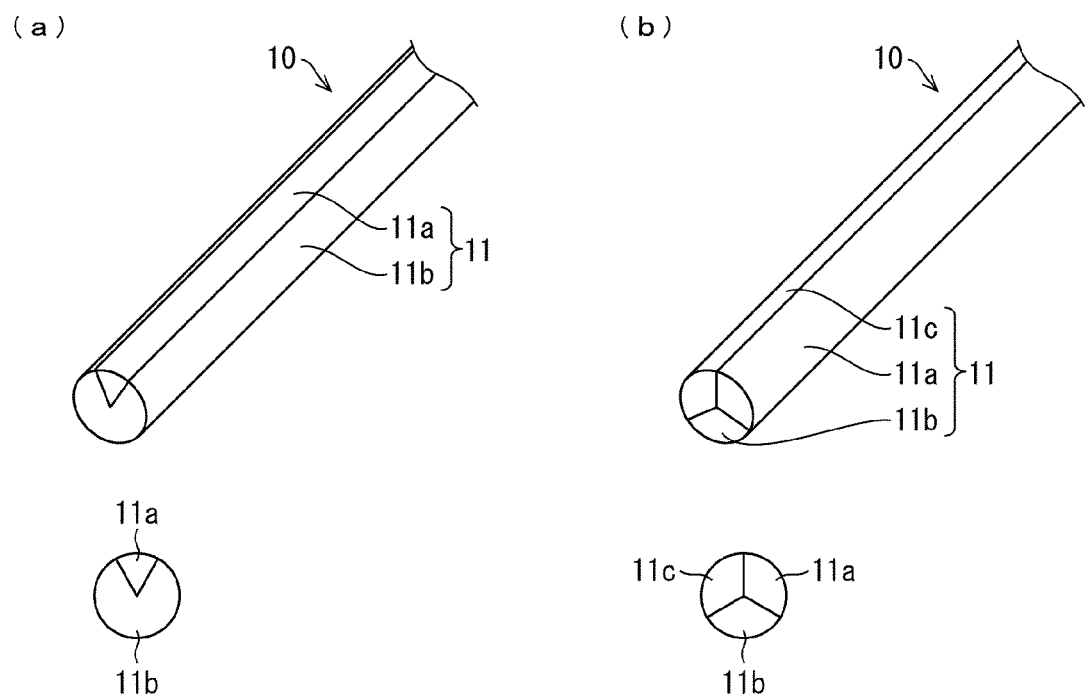

(a) and (b) of FIG. 11 each illustrate a variation of rod parts. In (a) and (b) of FIG. 11, the upper panel is a perspective view, and the lower panel is a cross-sectional view taken along a plane perpendicular to the central axis of the rotatable rod.

DESCRIPTION OF EMBODIMENTS

The following description will more specifically discuss the present invention on the basis of Embodiments with reference to the drawings. However, the present invention is not limited to the independent embodiments. An embodiment derived from a combination of technical means each disclosed in a different embodiment is also encompassed in the technical scope of the present invention.

Embodiment 1

Figure 1:
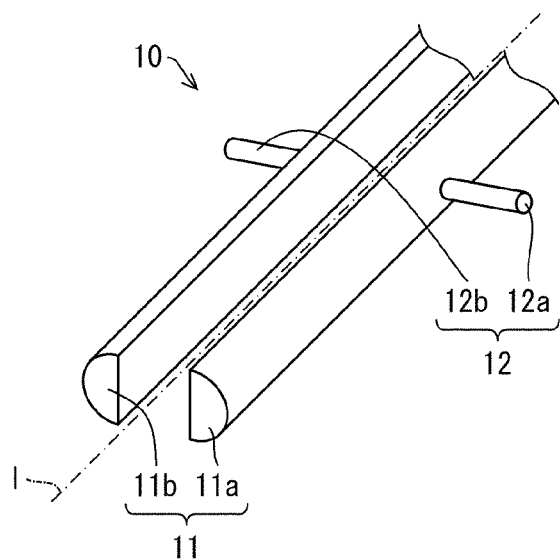
Figure 1:
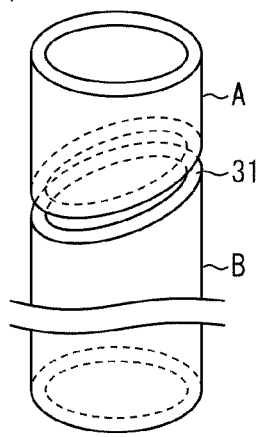
Figure 1:
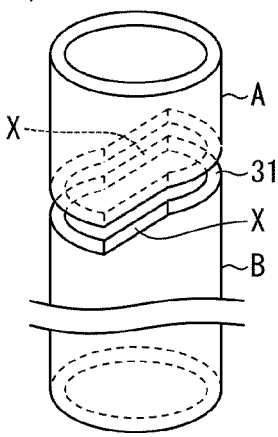
Figure 1:
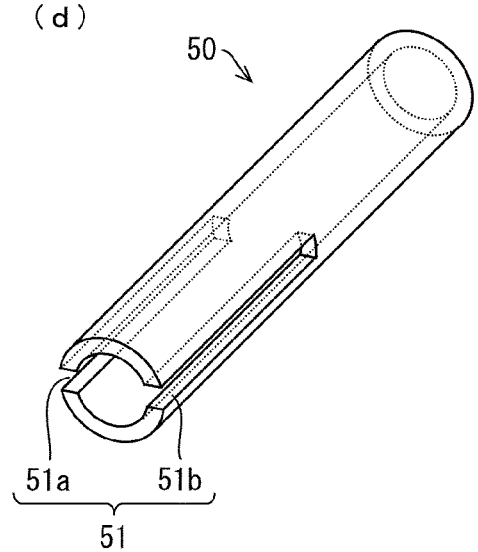
Figure 2:
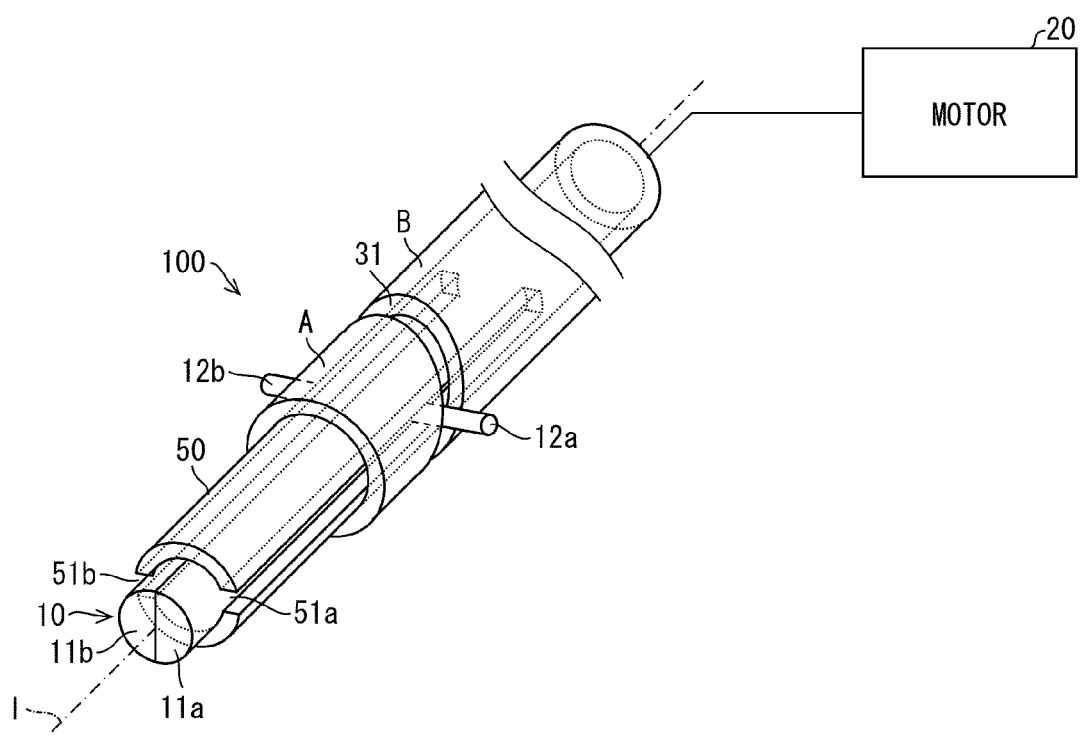
FIG. 2 illustrates a drive mechanism in accordance with Embodiment 1 of the present invention in an assembled state.
Figure 3:
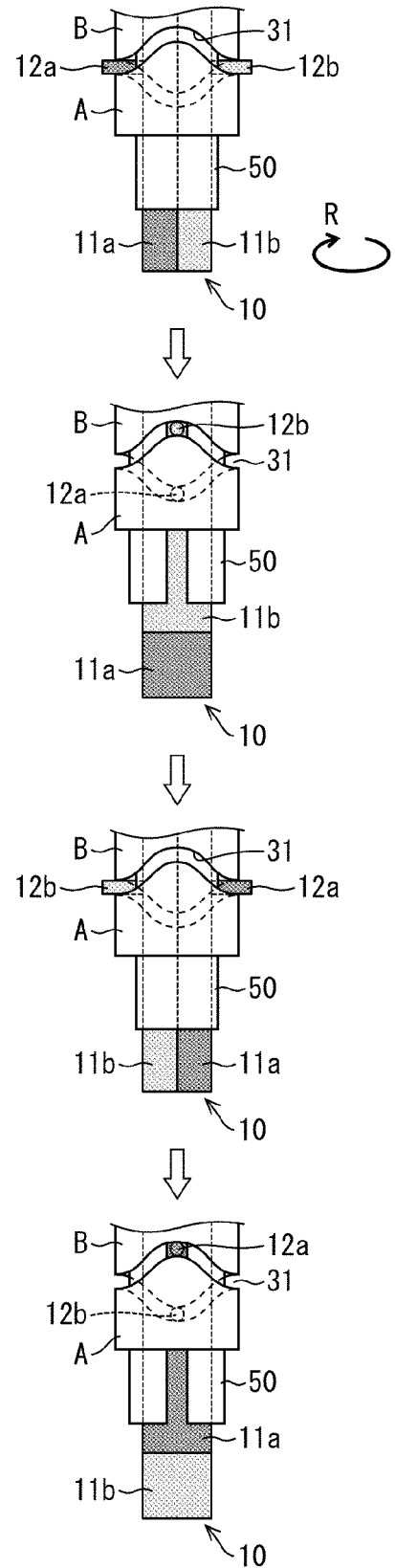
FIG. 3 is a transition diagram illustrating the manner in which the drive mechanism in accordance with Embodiment 1 of the present invention caries out driving.

The following description will discuss Embodiment 1 of the present invention with reference to FIGS. 1 to 3.

A drive mechanism 100 in accordance with Embodiment 1 includes:

1. a rotatable rod 10 that includes rod parts 11 which are separated by a boundary along a central axis 1, the rod parts 11 each being independently movable along the central axis 1 (see (a) of FIG. 1);

2. support members A and B having a slide groove 31 that is in the form of a ring and that surrounds the rotatable rod 10 (see (b) and (c) of FIG. 1); and 3. an outer cylinder 50 that is disposed between the rotatable rod 10 and the support members A and B and that has longitudinal grooves 51 each extending along the central axis 1 (see (d) of FIG. 1 and FIG. 2).

(a) of FIG. 1 is an exploded view of the rotatable rod of the drive mechanism 100 in accordance with Embodiment 1 of the present invention. The rotatable rod 10 is composed of a rod part 11*a* and a rod part 11*b*. The rod parts 11*a* and 11*b* have protrusions 12*a* and 12*b*, respectively. The protrusions 12*a* and 12*b* are capable of sliding in the slide groove 31, thereby changing in position along the central axis 1. This is described in detail with reference of (b) and (c) of FIG. 1.

(b) of FIG. 1 is a perspective view illustrating an example of the slide groove 31. The slide groove illustrated in (b) of FIG. 1 is formed on a plane diagonal to the central axis 1 of the rotatable rod, instead of a plane orthogonal to the central axis 1. The protrusions 12 are in fixed positions on the rod parts 11; therefore, as the protrusions 12 slide in the slide groove 31 having such a shape, the rod parts 11 necessarily move along the central axis 1.

(c) of FIG. 1 is a perspective view illustrating another example of the slide groove 31. The slide groove 31 illustrated in (c) of FIG. 1 has a sloping portion X. The sloping portion X is formed on a plane diagonal to the central axis 1. As the protrusions 12 move in such a slide groove 31, the rod parts 11 move along the central axis 1 while the protrusions 12 are passing through the sloping portion X but do not move along the central axis 1 while the protrusions 12 are passing through the other portions. Such a slide groove 31 can also be used as a constituent of the drive mechanism 100.

Note that, in (b) and (c) of FIG. 1, the slide groove 31 is illustrated as a gap between the support members A and B; however, it is only necessary that the slide groove 31 be formed such that the slide groove 31 allows the protrusions 12*a* and 12*b* to slide therein. For example, the following configuration may be employed: a housing for containing the rotatable rod 10 is used as a support member; and a recess in the housing is used as the slide groove 31.

(d) of FIG. 1 is a perspective view of the outer cylinder 50. The outer cylinder 50 has longitudinal grooves 51*a* and 51*b* each extending along the central axis 1. The protrusions 12*a* and 12*b* fit in the longitudinal grooves 51*a* and 51*b* and are capable of sliding in the longitudinal grooves 51*a* and 51*b*, respectively. Note that the longitudinal grooves 51 do not need to extend to an end of the outer cylinder 50 as illustrated in (d) of FIG. 1. That is, the shapes of the longitudinal grooves 51 are not particularly limited, provided that the protrusions 12 can slide in the slide groove 31. However, the outer cylinder 50 having longitudinal grooves 51 extending to an end of the outer cylinder 50 as illustrated in (d) of FIG. 1 is easier to process, and it is also easy to assemble the members as illustrated in FIG. 2. In cases where the outer cylinder 50 having such a shape is employed, the members may be assembled such that the rotatable rod 10 sticks out of the end where there are the longitudinal grooves 51 (see FIG. 2) or may be assembled such that the rotatable rod 10 sticks out of the end opposite the end where there are the longitudinal grooves 51. That is, the orientation of the outer cylinder 50, when the drive mechanism 100 is in an assembled state, may be reversed from that illustrated in FIG. 2.

The outer cylinder 50 has a plurality of roles in the drive mechanism 100. The roles are described below.

First, because the protrusions 12 fit in the longitudinal grooves 51, the rotation of the outer cylinder 50 causes the protrusions 12 to concurrently slide in the slide groove 31. That is, it is only necessary to cause the outer cylinder 50 to rotate in order to cause the rod parts 11 to rotate while causing the protrusions 12 to slide in the slide groove 31. As a result, it is only necessary to transmit rotational power to the outer cylinder 50 (with use of, for example, a single motor) in order to give rotational motion and reciprocating motion to the rod parts 11.

Secondly, the longitudinal grooves 51 of the outer cylinder 50 support the protrusions 12 so that the protrusions 12 change in position along the central axis 1 while sliding in the slide groove 31. This is the function attributed to the fact that the protrusions 12 are capable of sliding in the longitudinal grooves 51 in addition to the slide groove 31.

Thirdly, in a case where the rotatable rod is a hollow rod which allows a fluid to flow therein (for example, in a case where the drive mechanism 100 is used as a "puncture apparatus" as in Embodiment 3), the outer cylinder 50 can be used as a flow passage for the fluid. In such a case, it is preferable to employ an outer cylinder 50 having longitudinal grooves 51 extending to an end of the outer cylinder 50 and assemble the members such that the rotatable rod 10 sticks out of the end where there are longitudinal grooves 51 as illustrated in FIG. 2. That is, in a case where the drive mechanism 100 is used as a "puncture apparatus" as in Embodiment 3, it is preferable to assemble the members such that the tip of the rotatable rod 10 (hollow needle) sticks out of the end where there are the longitudinal grooves 51. Alternatively, it is also preferable to employ an outer cylinder 50 having longitudinal grooves 51 short of the end of the outer cylinder 50. With such a configuration, in a case where the outer cylinder 50 is used as a flow passage for a fluid, it is possible to minimize the leakage of the fluid out through the longitudinal grooves 51.

FIG. 2 illustrates the drive mechanism 100 in accordance with Embodiment 1 in an assembled state. The drive mechanism 100 is obtained by assembling the rotatable rod 10, the support members A and B, and the outer cylinder 50 as illustrated in FIG. 1.

As illustrated in FIG. 2, the outer cylinder 50 is connected to a motor 20. As described earlier, it is only necessary to transmit rotational power from the motor 20 and thereby cause the outer cylinder 50 to rotate about the central axis 1 in order to achieve the rotational motion of the rotatable rod 10 and the out-of-phase reciprocating motions of the rod parts 11. The rotational power transmitted to the outer cylinder 50 may be unidirectional rotational power or may be bidirectional rotational power by which clockwise and counterclockwise rotations are carried out alternately. Note that a means to supply rotational power is not limited to a motor. For example, a spiral spring may be used. Alternatively, rotational power may be generated manually. (The same applies to the "motor" that appears in the other parts of the present specification and the accompanying drawings.)

FIG. 3 is a transition diagram illustrating the manner in which the drive mechanism 100 drives the rotatable rod 10. In the example shown in FIG. 3, the slide groove 31 is formed on a plane diagonal to the central axis 1 (slide groove 31 as illustrated in (b) of FIG. 1 is employed). Therefore, as the protrusions 12a and 12b slide in the slide groove 31, the rod parts 11a and 11b change in position along the direction of the central axis 1. More specifically, during one turn of the protrusions 12a and 12b along the slide groove 31, each of the rod parts 11a and 11b carries out reciprocating motion in which "the rod part advances along the central axis 1 and moves back along the central axis 1". The reciprocating motions of the rod parts 11a and 11b here are out of phase, and are carried out alternately. That is, the rod part 11b moves back while the rod part 11a advances, whereas the rod part 11a moves back while the rod part 11b advances.

As such, in the drive mechanism 100, by applying rotational power for rotation about the central axis 1 from the motor 20 to the outer cylinder 50, it is possible to (i) cause the rotatable rod 10 to carry out rotational motion and (ii) cause the rod parts 11a and 11b to carry out out-of-phase reciprocating motions.

Note that, provided that the drive mechanism 100 is designed appropriately, the rod parts 11a and 11b can be caused to carry out out-of-phase reciprocating motions by causing the outer cylinder 50 to rotate such that the direction of rotation is reversed during rotation (for example, by causing the outer cylinder 50 to rotate clockwise by 180° and then rotate counterclockwise by 180°). Causing the outer cylinder 50 to rotate in such a manner makes it possible to (i) cause the rotatable rod 10 to carry out rotational motion during which the direction of rotation is reversed repeatedly and (ii) cause the parts 11a and 11b to carry out out-of-phase reciprocating motions.

Embodiment 2

The following description will discuss Embodiment 2 of the present invention with reference to FIGS. 4 to 6.

A drive mechanism 200 in accordance with Embodiment 2 includes:

1. a rotatable rod 10 that includes rod parts 11 which are separated by a boundary along a central axis 1 (the rod parts 11 have respective cam followers 15 connected thereto, see (a) of FIG. 4);

2. rotating cams 35 in which the distance from the center of rotation to the outer circumferential surface is not constant (see (b) and (c) of FIG. 4); and 3. a cam rotating mechanism 36 configured to cause the rotating cams 35 to rotate out of phase with each other (see FIG. 5).

The cam followers 15 abut the outer circumferential surfaces of the respective rotating cams 35 and are configured to move along the central axis 1 as the rotating cams 35 rotate. It is noted here that, since the rotating cams 35 rotate out of phase with each other, the movements of the cam followers 15 along the central axis 1 are also out of phase with each other. That is, as the cam rotating mechanism 36 causes the rotating cams 35 to rotate, the rod parts 11 connected to the cam followers 15 carry out out-of-phase reciprocating motions. When rotational power is transmitted from, for example, the motor 20 to such a drive mechanism 200 as a whole (that is, the rotatable rod 10, the cam followers 15, the rotating cams 35, and the cam rotating mechanism 36), the rotational motion of the rotatable rod 10 and the out-of-phase reciprocating motions of the rod parts 11 can be achieved concurrently.

(a) of FIG. 4 is an exploded view of the rotatable rod 10 of the drive mechanism 200 in accordance with Embodiment 2. The rotatable rod 10 is composed of the rod part 11a and rod part 11b. The rod parts 11a and 11b have cam followers 15a and 15b connected thereto, respectively. The cam followers 15a and 15b are each in the form of an L-shaped rod, and extend from the side surfaces of the rod parts 11a and 11b rearward.

(b) and (c) of FIG. 4 are each a perspective view illustrating an example of a rotating cam 35 of the drive mechanism 200 in accordance with Embodiment 2. (b) of FIG. 4 illustrates a rotating cam 35 in the form of an elliptic cylinder, and (c) of FIG. 4 illustrates a rotating cam 35 in the form of a cylinder in which the center of rotation is offset from the center of the cylinder. In each of these rotating cams 35, the distance from the center of rotation O to the outer circumferential surface is not constant (attention should be focused on the fact that distance L1 and distance L2 differ from each other). The rotating cams 35 are rotatable about an axis perpendicular to the central axis 1 (see FIG. 5).

(a) of FIG. 5 illustrates the drive mechanism 200 in accordance with Embodiment 2 in an assembled state. In the drive mechanism 200, the outer circumferential surfaces of the rotating cams 35a and 35b abut the cam followers 15a and 15b provided on the rod parts 11a and 11b, respectively. The rotating cams 35a and 35b can be caused to rotate by the cam rotating mechanism 36.

The cam rotating mechanism 36 includes an input shaft 36a, a driving bevel gear 36b, and two driven bevel gears 36c. The input shaft 36a is disposed parallel to the central axis 1 and is caused to rotate by a rotary drive source 38 (such as a motor). The driving bevel gear 36b is provided on the input shaft 36a and rotates about the input shaft 36a. The two driven bevel gears 36c mesh with the driving bevel gear 36b. The driven bevel gears 36c are provided with the rotating cams 35a and 35b, respectively. In the example illustrated in FIG. 5, the rotating cams 35a and 35b are each in the form of an ellipse as illustrated in (b) of FIG. 4. The rotating cams 35a and 35b are disposed out of phase with each other. Specifically, the rotating cam 35a is disposed such that the minor axis of the ellipse is parallel to the central axis 1, whereas the rotating cam 35b is disposed such that the major axis of the ellipse is parallel to the central axis.

The example of the cam rotating mechanism 36 illustrated in FIG. 5 is preferred because the structure of the drive mechanism 200 is simple. However, the structure of the cam rotating mechanism 36 is not particularly limited, provided that the cam rotating mechanism 36 is capable of causing the rotating cams 35a and 35b to rotate out of phase with each other. Note that, for "the rotating cams 35a and 35b to rotate out of phase with each other" in the drive mechanism illustrated in FIG. 5, for example, it is only necessary to appropriately set the orientations and shapes of the rotating cams 35 provided on the driven bevel gears 36c.

Note that, in (a) of FIG. 5, power to cause the drive mechanism 200 as a whole (that is, the rotatable rod 10, the cam followers 15, the rotating cams 35, and the cam rotating mechanism 36) to rotate about the central axis 1 is transmitted to the cam followers 15a and 15b. However, the power from the motor 20 may be transmitted to any part, provided that the drive mechanism 200 as a whole can be caused to rotate.

As illustrated in (b) of FIG. 5, the outer cylinder 50 can be used also in combination with the drive mechanism 200. The outer cylinder 50 for the drive mechanism 200 serves to support the cam followers 15 such that the cam followers 15 move along the central axis 1. Furthermore, in a case where the rotatable rod allows a fluid to flow therein and the outer cylinder 50 is also used as a flow passage for the fluid, the outer cylinder 50 also serves to minimize the leakage of the fluid out through the longitudinal grooves 51.

FIG. 6 shows transition diagrams illustrating the manner in which the drive mechanism 200 carries out driving. (a) of FIG. 6 illustrates the manner in which the rod parts are caused to move back and forth alternately by the cam rotating mechanism 36, and (b) of FIG. 6 illustrates a case in which rotational power is further transmitted by the motor 20 to the drive mechanism 200. Note that the transmitted rotational power may be (i) unidirectional rotational power or (ii) bidirectional rotational power by which clockwise and counterclockwise rotations are carried out alternately.

It is noted here that the driven bevel gears 36c have the function of engaging with the driving bevel gear 36b and converting the rotation of the driving bevel gear 36b into the rotation of the rotating cams 35a and 35b. More specifically, the rotating cams 35a and 35b rotate via the following mechanism (see (a) of FIG. 6).

Specifically, as the rotary drive source 38 causes the input shaft 36a to rotate, the driving bevel gear 36b provided on the input shaft 36a rotates. As the driving bevel gear 36b rotates, the driven bevel gears 36c, which are in mesh with the driving bevel gear 36b, rotate about an axis perpendicular to the direction of extension of the input shaft 36a (the two driven bevel gears 36c here rotate in the opposite directions). Then, the rotation of the driven bevel gears 36c causes the rotating cams 35a and 35b rotate, respectively. The rotating cams 35a and 35b here rotate about an axis perpendicular to the rotation axis of the driving bevel gear 36b.

The cam followers 15a and 15b abut the rotating cams 35a and 35b, respectively. In each of the rotating cams 35a and 35b, the distance from the center of rotation to the outer circumferential surface is not constant. Therefore, the points of contact between the cam followers 15a and 15b and the rotating cams 35a and 35b move back and forth along the central axis 1. As the points of contact change in position, the rod parts 11a and 11b carry out reciprocating motions along the central axis 1.

Furthermore, the rotating cams 35a and 35b are each in the form of an ellipse, are disposed out of phase with each other, and rotate in the opposite directions. Therefore, the rod part 11a and the rod part 11b do not carry out reciprocal movements in synchronization with each other. It follows that the rod parts 11a and 11b carry out out-of-phase reciprocating motions.

Note that the difference in phase between the rotations of the rotating cams 35a and 35b caused by the cam rotating mechanism 36 can be set as appropriate according to the frequency of the reciprocating motions of the rod parts 11a and 11b, points in time at which the rod parts 11a and 11b carry out out-of-phase reciprocating motions, and/or the like. The shapes and positions of the rotating cams 35a and 35b can be set as appropriate in accordance with the difference in phase between the rotations of the rotating cams 35a and 35b.

Embodiment 3

The following description will discuss an application example of the drive mechanisms 100 and 200 described in Embodiments 1 and 2. FIG. 7 is a block diagram illustrating a main part of a perforating apparatus 300 in accordance with Embodiment 3 of the present invention. The perforating apparatus 300 includes the drive mechanism 100 or the drive mechanism 200, and further includes a motor 20 and a translation section 40. The translation section 40 is capable of causing the rotatable rod 10, which is in reciprocating motion, to move along the central axis 1. The rotatable rod 10 here rotates about the central axis 1, and the rod parts 11 here carry out out-of-phase reciprocating motions along the central axis 1. Note that a known mechanism (such as a rack and pinion) can be employed as the translation section 40.

The combination of the rotational motion of the rotatable rod 10 and the out-of-phase reciprocating motions of the rod parts 11 makes it possible to reduce resistance that is generated when the rotatable rod 10 is inserted into a subject to be perforated. This makes it possible to reduce the damage to the subject and reduce the energy used to perforate the subject.

(Specific Example of Perforating Apparatus)

In a case where the rotatable rod 10 is a hollow needle as illustrated in (a) of FIG. 8, the perforating apparatus 300 can be used as a puncture apparatus (for example, an injector). The puncture apparatus is capable of collecting or injecting a fluid through the hollow needle, and therefore can be used in general medical applications such as blood sampling, surgery, and drug delivery.

By causing the hollow needle to act in the above manner, it is possible to reduce puncture resistance that is generated when the hollow needle is inserted into a subject to be punctured. This makes it possible to, for example, alleviate pain associated with the puncture.

Furthermore, the drive mechanisms 100 and 200 have a simple structure and therefore can be reduced in size easily. The drive mechanisms 100 and 200 can therefore be provided at low cost. Therefore, the perforating apparatus 300 is particularly suitable for use as a puncture apparatus.

Moreover, with use of a rotatable rod 10 which is a solid needle as illustrated in (b) of FIG. 8, it is possible to make a hole in a subject to be perforated. With use of a rotatable rod 10 in the form of a tube as illustrated in (c) of FIG. 8, it is possible to make a hole in a subject to be perforated and also draw the subject into the hollow space. That is, with the rotatable rod 10 as illustrated in (c) of FIG. 8, it is possible to draw out a sample of the subject. More specifically, such a perforating apparatus can be used in material processing (drilling, punching, etc.), taking samples, injecting fluids, boring, and the like.

[Advantages of Drive Mechanism 100 and Drive Mechanism 200]

With the drive mechanism 100, the rotation of the rotatable rod 10 and out-of-phase reciprocation motions of the rod parts 11 can be achieved only with use of a single rotational power source (such as a motor). The parts count can also be reduced. The drive mechanism 200 can be prepared by combining existing parts, and therefore achieves highly reliable operation. The drive mechanism 200 can also be reduced in size.

[Variation 1]

In the foregoing embodiments, the drive mechanism 100 (or 200) may further include a mechanical conversion mechanism 22 that mechanically converts unidirectional rotational motion into rotational motion in which clockwise and counterclockwise rotations are repeated alternately. The mechanical conversion mechanism 22 receives a unidirectional rotational driving force and outputs a rotational driving force in which counterclockwise and clockwise rotations appear alternately. In a case where the drive mechanism 100 (or 200) includes the mechanical conversion mechanism 22, it is possible to mechanically obtain, from a unidirectional rotary drive force, bidirectional rotational motion in clockwise and counterclockwise directions. It follows that the rotatable rod 10 carries out rotational motion in which clockwise and counterclockwise rotations are repeated alternately. With this configuration, it is possible to cause the rotatable rod 10 to repeat clockwise and counterclockwise rotations alternately without having to, for example, control a motor in a complex manner (with use of a motor having a simple structure).

The mechanical conversion mechanism 22 can be constituted by a known mechanism. FIG. 9 illustrates an example of a configuration of the mechanical conversion mechanism 22. The configuration of the mechanical conversion mechanism 22 illustrated in FIG. 9 makes use of a differential gear mechanism using a partially toothed bevel gear. The mechanical conversion mechanism 22 is composed of a partially toothed bevel gear G11, bevel gears G12 and G13, and a shaft S. The partially toothed bevel gear G11 is connected to a motor M. The partially toothed bevel gear G11 is partially toothed and is configured to mesh with the bevel gear G12 or G13. The shaft S is a member through which rotational motion is transmitted to the rotatable rod 10, and the bevel gears G12 and G13 are fixed to the shaft S. The bevel gear G12 meshes with the partially toothed bevel gear G11, so that the shaft S rotates counterclockwise. The bevel gear G13 meshes with the partially toothed bevel gear G11, so that the shaft S rotates clockwise.

FIG. 10 schematically illustrates the manner in which the direction of rotation is reversed by the mechanical conversion mechanism 22 illustrated in FIG. 9. The partially toothed bevel gear G11 is partially toothed. Therefore, while rotating, the partially toothed bevel gear G11 meshes with only the bevel gear G12 or only the bevel gear G13.

(a) of FIG. 10 illustrates the partially toothed bevel gear G11 which is in mesh only with the bevel gear G12. In this situation, the shaft S rotates counterclockwise when seen from the bevel gear G12. (b) of FIG. 10 illustrates the partially toothed bevel gear G11 in mesh only with the bevel gear G13. In this situation, the shaft S rotates clockwise when seen from the bevel gear G12. Note that the direction of rotation of the partially toothed bevel gear G11 is the same between (a) and (b) of FIG. 10.

[Variation 2]

The following description will discuss a variation of a configuration of the rod parts 11 with reference to FIG. 11. As described earlier, the rod parts 11 correspond to the rotatable rod 10 divided along the central axis 1. The foregoing embodiments deal with examples of the rod parts 11 which correspond to the rotatable rod 10 divided in half along the central axis 1. Other examples of the rod parts 11 include those illustrated in (a) and (b) of FIG. 11.

(a) of FIG. 11 illustrates an example in which the rod part 11a is smaller than the rod part 11b (this is more apparent with reference to the cross-sectional view in the lower panel). (b) of FIG. 11 illustrates an example in which the rotatable rod 10 is divided in three parts: rod parts 11a and 11b, and 11c (this is also more apparent with reference to the cross-sectional view in the lower panel).

As is apparent from FIG. 11, the phrase "correspond to the rotatable rod 10 divided along the central axis 1" can be described as follows: "the boundary surface between adjacent rod parts 11 is parallel to (or substantially parallel to) the central axis 1". Needless to say, the boundary surface between adjacent rod parts 11 may not be perfectly parallel to the central axis 1 and may not be flat, provided that the out-of-phase reciprocating motions of the rod parts 11 are available.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

The present invention includes the following features.

<1>

A drive mechanism 100 including:

a rotatable rod 10 that includes rod parts 11 which are separated by a boundary along a central axis 1, the rod parts 11 each being independently movable along the central axis 1;

support members A and B having a slide groove 31 that is in the form of a ring and that surrounds the rotatable rod 10; and an outer cylinder 50 that is disposed between the rotatable rod 10 and the support members A and B and that has longitudinal grooves 51 each extending along the central axis 1, in which the rod parts 11 have respective protrusions 12 that stick out from side surfaces of the respective rod parts 11, the protrusions 12 are capable of sliding in the slide groove 31 and the longitudinal grooves 51, the rod parts 11 having the respective protrusions 12 are configured such that sliding of each of the protrusions 12 in the slide groove 31 causes a corresponding one of the rod parts 11 to move along the central axis 1, and the protrusions 12 are configured such that rotation of the outer cylinder 50 about the central axis 1 causes each of the protrusions 12 to slide in the slide groove 31.

<2>

A drive mechanism 200 including:

a rotatable rod 10 that includes rod parts 11 which are separated by a boundary along a central axis 1, the rod parts 11 each being independently movable along the central axis 1;

cam followers 15 connected to the respective rod parts 11;

rotating cams 35 in each of which a distance from a center of rotation to an outer circumferential surface is not constant; and a cam rotating mechanism 36 configured to cause the rotating cams 35 to rotate out of phase with each other, in which the cam followers 15 abut the outer circumferential surfaces of the respective rotating cams 35 and are configured to move along the central axis 1 as the rotating cams 35 rotate, and the rotatable rod 10, the cam followers 15, the rotating cams 35, and the cam rotating mechanism 36 are configured to be rotatable about the central axis 1.

<3>

The drive mechanism 200 described in <2>, in which the cam rotating mechanism 36 includes:

an input shaft 36a that is disposed parallel to the central axis 1 and that is configured to be rotated by a rotary drive source 38;

a driving bevel gear 36b disposed on the input shaft 36a; and driven bevel gears 36c that mesh with the driving bevel gear 36b and that are configured to convert rotation of the driving bevel gear 36b into rotational motion of the rotating cams 35, the driven bevel gears 36c being provided with the respective rotating cams 35.

<4>

The drive mechanism 100 or 200 as described in any one of <1> to <3>, further including a mechanical conversion mechanism 22 configured to mechanically convert unidirectional rotational motion into rotational motion in which clockwise and counterclockwise rotations are repeated alternately.

<5>

A perforating apparatus 300 including:

a drive mechanism 100 or 200 as described in any one <1>to <4>; and a translation section 40 configured to cause the rotatable rod 10 to move along the central axis 1 while the rod parts 11 are in reciprocating motion.

REFERENCE SIGNS LIST

10: rotatable rod
11: rod parts
12: protrusion
15: cam follower
22: mechanical conversion mechanism
31: slide groove
35: rotating cam
36: cam rotating mechanism
36a: input shaft
36b: driving bevel gear
36c: driven bevel gear
38: rotary drive source
40: translation section
100, 200: drive mechanism
300: perforating apparatus
A, B: support member
1: central axis of rotatable rod (central axis)

The invention claimed is:

1. A drive mechanism comprising:
a rotatable rod that includes rod parts which are separated by a boundary along a central axis, the rod parts each being independently movable along the central axis;
a support member having a slide groove that is in the form of a ring and that surrounds the rotatable rod; and
an outer cylinder that is disposed between the rotatable rod and the support member and that has longitudinal grooves each extending along the central axis, wherein
the rod parts have respective protrusions that stick out from side surfaces of the respective rod parts,
the protrusions are capable of sliding in the slide groove and the longitudinal grooves,
the rod parts having the respective protrusions are configured such that sliding of each of the protrusions in the slide groove causes a corresponding one of the rod parts to move along the central axis, and
the protrusions are configured such that rotation of the outer cylinder about the central axis causes each of the protrusions to slide in the slide groove.

2. The drive mechanism as set forth in claim 1, further comprising a mechanical conversion mechanism configured to mechanically convert unidirectional rotational motion into rotational motion in which clockwise and counterclockwise rotations are repeated alternately.

3. A perforating apparatus comprising:
a drive mechanism as set forth in claim 1; and
a translation section configured to cause the rotatable rod to move along the central axis while the rod parts are in reciprocating motion.

* * * * *